(12) United States Patent
Lee et al.

(10) Patent No.: US 10,443,568 B2
(45) Date of Patent: Oct. 15, 2019

(54) WIND POWER GENERATING DEVICE OF TRANSPORTATION VEHICLE

(71) Applicants: Shou-Hsun Lee, Tainan (TW); Chun-I Li, Tainan (TW)

(72) Inventors: Shou-Hsun Lee, Tainan (TW); Chun-I Li, Tainan (TW)

(*) Notice: Subject to any disclaimer, the term of this patent is extended or adjusted under 35 U.S.C. 154(b) by 0 days.

(21) Appl. No.: 15/868,977

(22) Filed: Jan. 11, 2018

(65) Prior Publication Data

US 2019/0093631 A1 Mar. 28, 2019

(30) Foreign Application Priority Data

Sep. 25, 2017 (TW) .............................. 106132705 A

(51) Int. Cl.
| | |
|---|---|
| *F03D 7/02* | (2006.01) |
| *F03D 9/32* | (2016.01) |
| *F03D 9/25* | (2016.01) |
| *F03D 7/04* | (2006.01) |
| *F03D 9/11* | (2016.01) |

(52) U.S. Cl.
CPC ......... *F03D 7/0248* (2013.01); *F03D 7/0244* (2013.01); *F03D 7/041* (2013.01); *F03D 9/25* (2016.05); *F03D 9/32* (2016.05); *F03D 9/11* (2016.05); *F05B 2260/902* (2013.01); *F05B 2270/20* (2013.01); *F05B 2270/3201* (2013.01)

(58) Field of Classification Search
CPC ........ F03D 7/02; F03D 7/0244; F03D 7/0248; F03D 9/11; F03D 9/25; F03D 9/32; F03D 7/041; B60L 8/006; F16D 59/02; F05B 2260/902; F05B 2270/20; F05B 2270/3201
See application file for complete search history.

(56) References Cited

U.S. PATENT DOCUMENTS

| | | | | |
|---|---|---|---|---|
| 2,112,900 | A * | 4/1938 | McColly | ............... F03D 7/0248 188/155 |
| 3,918,556 | A * | 11/1975 | Nagatomo | ............... F16D 49/08 188/196 BA |
| 5,701,977 | A * | 12/1997 | Vrevich | .................... B60T 7/14 180/272 |
| 8,004,232 | B2 * | 8/2011 | Schultz | ............... H01M 10/465 320/101 |

(Continued)

*Primary Examiner* — Nathaniel E Wiehe
*Assistant Examiner* — Michael K. Reitz
(74) *Attorney, Agent, or Firm* — AEON Law, PLLC; Adam L. K. Philipp; Martin S. Garthwaite

(57) ABSTRACT

A wind power generating device includes: a power source assembly and a power generating assembly, the power source assembly including a brake disc and a brake actuator, the brake actuator being configured to swing around a lever fulcrum, and the brake actuator being provided with a wind collector on one side with respect to the lever fulcrum to receive wind force and a brake pad corresponding to the brake disc on the other side such that when the wind collector swings backward because of wind force from the front, the brake pad relatively swings frontward to touch the brake disc by leverage so as to apply a brake force to a rotor component of the power source assembly, and the power generating assembly including a maximum power point tracker (MPPT) such that the generated electric energy is stored to an energy storage element under control of the MPPT.

9 Claims, 9 Drawing Sheets

(56) References Cited

U.S. PATENT DOCUMENTS 8,710,691 B2 * 4/2014 Haddad .................. B60L 8/006
290/55
9,024,463 B2 * 5/2015 Boone .................... F03D 3/005
290/55

* cited by examiner

| Vehicle speed (km/hr) | Wind speed (m/s) | Vehicle speed (km/hr) | Wind speed (m/s) |
|---|---|---|---|
| 20.0 | 2.5 | 60.0 | 16.5 |
| 30.0 | 5.6 | 60.3 | 16.6 |
| 34.7 | 6.5 | 64.5 | 18.3 |
| 40.0 | 7.5 | 70.0 | 20.5 |
| 45.4 | 10.5 | 73.6 | 21.9 |
| 50.0 | 13.1 | 80.0 | 24.4 |
| 54.4 | 14.6 | 85.0 | 27.2 |

| Wind speed (m/s) | Power voltage (V) | Wind speed (m/s) | Power voltage (V) |
|---|---|---|---|
| 3.6 | 1.49 | 5.0 | 4.16 |
| 3.9 | 1.97 | 5.9 | 4.72 |
| 4.1 | 2.28 | 6.1 | 5.22 |
| 4.2 | 2.47 | 6.3 | 5.42 |
| 4.5 | 2.58 | 6.5 | 5.73 |
| 4.6 | 3.09 | 6.7 | 5.75 |
| 4.7 | 3.40 | 7.0 | 5.97 |
| 4.9 | 3.71 | 8.0 | 6.11 |

| Wind speed (m/s) | Power current (mA) | Wind speed (m/s) | Power current (mA) |
|---|---|---|---|
| 3.6 | 2.0 | 5.0 | 5.0 |
| 3.9 | 2.2 | 5.9 | 15.0 |
| 4.1 | 2.5 | 6.1 | 16.0 |
| 4.2 | 2.6 | 6.3 | 22.0 |
| 4.5 | 3.0 | 6.5 | 23.0 |
| 4.6 | 3.9 | 6.7 | 24.0 |
| 4.7 | 4.0 | 7.0 | 24.0 |
| 4.9 | 4.7 | 8.0 | 24.0 |

| Wind speed (m/s) | Electrical power (mW) | Wind speed (m/s) | Electrical power (mW) |
|---|---|---|---|
| 3.6 | 3.0 | 5.0 | 20.8 |
| 3.9 | 4.3 | 5.9 | 70.8 |
| 4.1 | 5.7 | 6.1 | 83.5 |
| 4.2 | 6.4 | 6.3 | 119.2 |
| 4.5 | 7.7 | 6.5 | 131.8 |
| 4.6 | 12.1 | 6.7 | 138.0 |
| 4.7 | 13.6 | 7.0 | 143.3 |
| 4.9 | 17.4 | 8.0 | 146.6 |

WIND POWER GENERATING DEVICE OF TRANSPORTATION VEHICLE

FIELD OF THE INVENTION

The present invention relates to a wind power generating device, and more particularly relates to a wind power generating device having a braking function for a transportation vehicle.

BACKGROUND OF THE INVENTION

Based on the willingness to make good use of energy power, a wind power generating device to be mounted on a transportation vehicle, such as a scooter or a car, has been developed such that, when the transportation vehicle is running, the generated wind power accompanying the wind flow can be converted into kinetic energy and then further be converted into electric energy.

The structure of this kind of wind power generating device mainly includes a blade, a drive shaft and a power generator, the blade being able to be driven by wind power to rotate thereby converting kinetic power of the wind into mechanical energy of the drive shaft so as to drive the power generator to rotate to generate power.

However, when the running speed of the transportation vehicle becomes so fast that the wind flow speed become too fast, the blade and the power generator can burn up and break because of a too high speed rotating. Therefore, an improvement for the wind power generating device of transportation vehicle is needed.

SUMMARY OF THE INVENTION

Therefore, an objective of the present invention is to provide a wind power generating device with self-adjusting braking mechanism.

In order to achieve the above, the present invention provides a wind power generating device, comprising: a power source assembly which includes a rotor component and a brake component, the rotor component including a blade and a drive shaft, the blade being served to receive the wind force from the front side to rotate, the drive shaft being in driven connection with the blade to transfer the rotary motion of the blade, the brake component including a brake disc and a brake actuator, the brake disc being positioned at the back side of the blade and being configured to interlink with the blade so as to rotate together with the blade, the brake actuator being configured to swing around a lever fulcrum, and the brake actuator being configured with a wind collector on one side with respect to the lever fulcrum to receive the wind force from the front side and a brake pad corresponding to the brake disc on the other side with respect to the lever fulcrum such that when the wind collector swings backward with the pushing of the wind force from the front side, the brake pad relatively swings frontward to touch the brake disc by means of the leverage of the brake actuator so as to apply a brake force in such a manner that the rotor component is braked; and a power generating assembly, which includes a power generating element, a maximum power point tracker (MPPT) and an energy storage element which are electrically connected to each other, the power generating element being in drive connection with the drive shaft such that the power generating element is driven by the drive shaft to generate electric energy, and the generated electric energy is stored to the energy storage element under the control of the maximum power point tracker.

In one embodiment of the present invention, a wind power generating device is provided that the brake component further includes an elastic restoration part, the elastic restoration part is provided with one end connected to a fixed mount and the other end connected to the brake actuator such that an elastic restoring force applied to the brake actuator makes the wind collector of the brake actuator swing frontward to return to an initial position and make the brake pad of the brake actuator swing backward to release a brake.

In one embodiment of the present invention, a wind power generating device is provided that the brake component further includes an adjuster which is connected between a fixed mount and the elastic restoration part, the adjuster being configured to change the relative position between the elastic restoration part and the fixed mount so as to adjust the elastic restoring force of the elastic restoration part applied to the brake actuator.

In one embodiment of the present invention, a wind power generating device is provided that the adjuster is adjustably screwed to the fixed mount to adjust the elastic restoring force of the elastic restoration part applied to the brake actuator by being screwed in or screwed out with respect to the fixed mount to adjust a relative position between the elastic restoration part and the fixed mount.

In one embodiment of the present invention, a wind power generating device is provided that the wind collector is in flat plate shape.

In one embodiment of the present invention, a wind power generating device is provided that the wind collector is in spoon shape.

In one embodiment of the present invention, a wind power generating device is provided that the blade is a scroll type blade or a screw type blade or a spherical blade or a Venetian blade.

In one embodiment of the present invention, a wind power generating device is provided that the brake actuator is configured to stay still facing to a wind force when the wind force is weaker than 90 km/hr.

In one embodiment of the present invention, a transportation vehicle is provided comprising the wind power generating device as mentioned above.

By means of the technology used by the present invention, when the rotor component rotates at a wind speed which exceeds a specified value, the wind collector is pushed by the wind force to swing backward such that the brake pad moves relatively to swing frontward to touch the brake disc positioned in front of the brake pad so as to apply a brake force in such a manner that the rotor component is braked. Moreover, a maximum power point tracker (MPPT) is configured to ensure the power supply to be kept at the highest efficiency. Preferably, the adjuster is provided to adjust the relative position between the elastic restoration part and the fixed mount so as to adjust the elastic restoring force of the elastic restoration part applied to the brake actuator.

DETAILED DESCRIPTION OF THE PREFERRED EMBODIMENTS

The preferred embodiments of the present invention are described in detail below with reference to FIG. 1 to FIG. 9. The description is used for explaining the embodiments of the present invention only, but not for limiting the scope of the claims.

Figure 1:
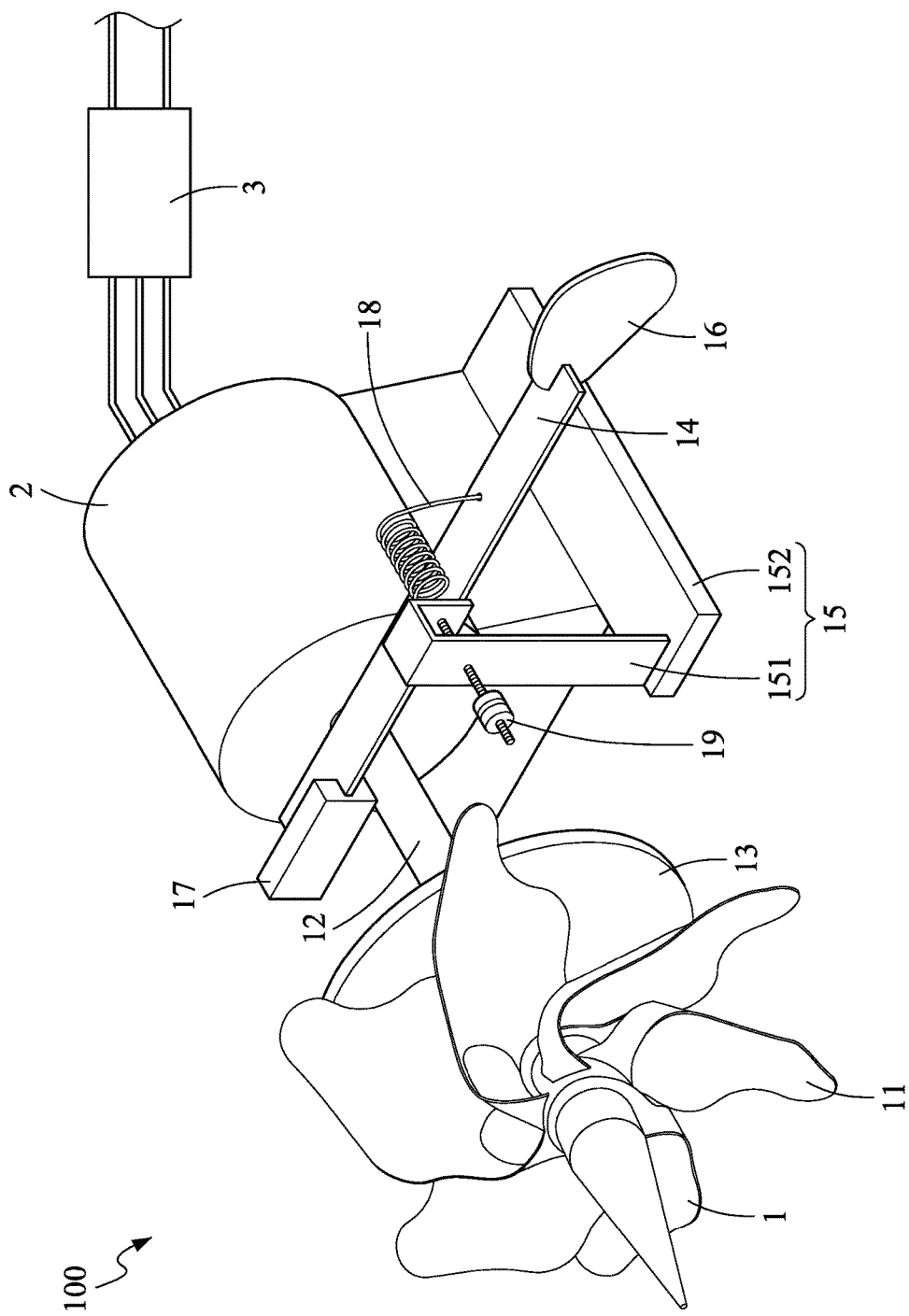
FIG. 1 is a perspective view illustrating a wind power generating device according to one embodiment of the present invention.

As shown in FIG. 1, a wind power generating device 100 according to a first embodiment of the present invention includes a power source assembly 1 and a power generating assembly.

Figure 3:
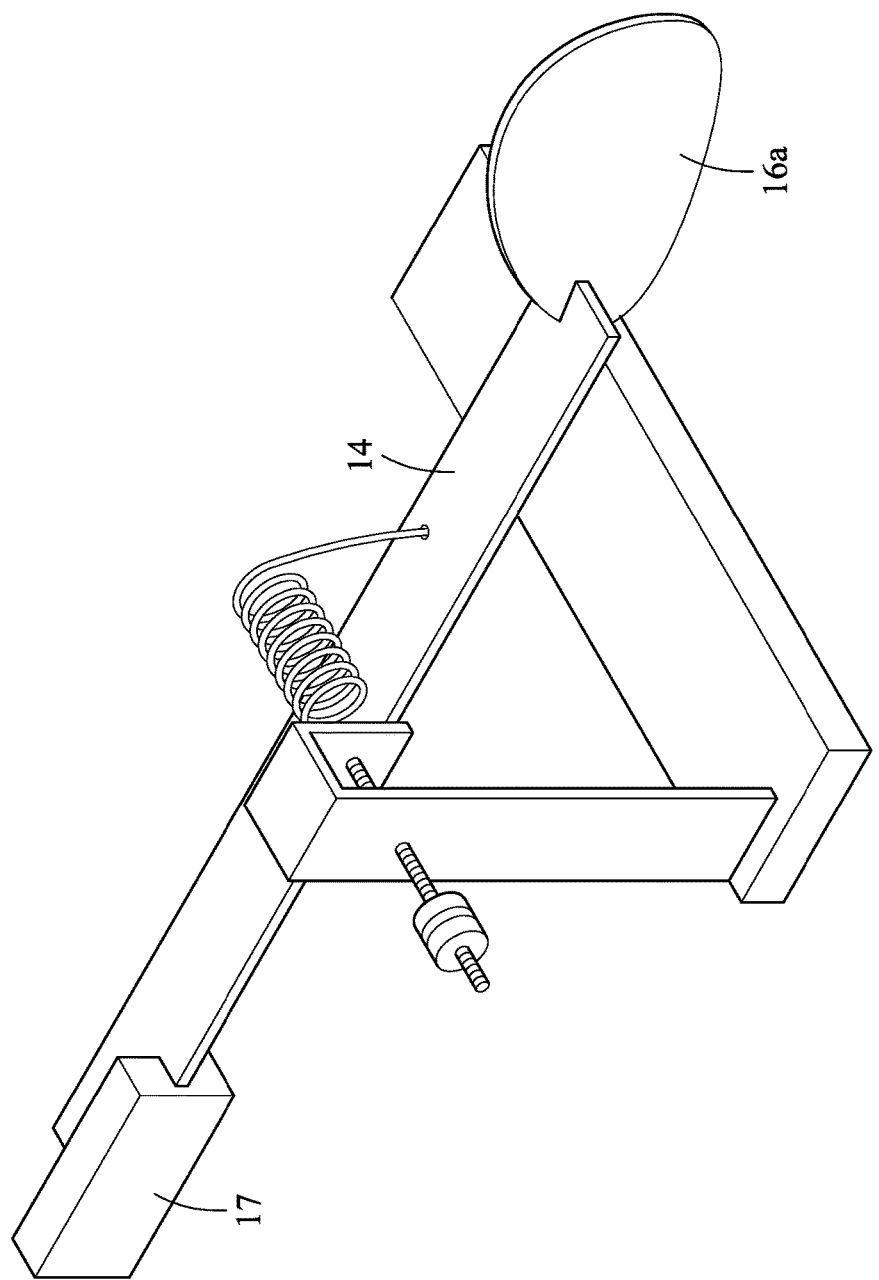
FIG. 3 is a perspective view illustrating a wind collector of a wind power generating device according to another embodiment of the present invention.

In more detail, the wind power generating device of the present invention is to be used by being mounted on a transportation vehicle, the transportation vehicle including electric car, electric scooter, electric bicycle, electric train, boat, flight vehicle, etc. As shown in FIG. 1, the power source assembly 1 includes a rotor component and a brake component. The rotor component including a blade 11 and a drive shaft 12, the blade 11 which is a scroll type blade being served to receive the wind force from the front side to rotate, the drive shaft 12 being in driven connection with the blade 11 to transfer the rotary motion of the blade 11. Of course, the present invention is not limited thereto. In the other embodiments, the blade can be a screw type blade or a spherical blade or a Venetian blade. The brake component includes a brake disc 13 and a brake actuator. The brake disc 13 is positioned at the back side of the blade 11 and is configured to interlink with the blade 11 so as to rotate together with the blade 11, the brake actuator being configured to swing around a lever fulcrum. In more detail, the brake actuator includes a lever 14 and a fixed mount 15, the fixed mount 15 being disposed at the power generating assembly, and including a support 151 which is approximately in inverted L shape and a base plate 152 being connected under the support 151. The lever 14 is arranged horizontally on the support 151 of the fixed mount 15, the point where the lever 14 is connected to the support 151 of the fixed mount 15 being served as the lever fulcrum. The brake actuator is provided with a wind collector 16 on one side with respect to the lever fulcrum to receive the wind force from the front side and a brake pad 17 corresponding to the brake disc 13 on the other side with respect to the lever fulcrum such that when the wind collector 16 swings backward with the pushing of the wind force from the front side, the brake pad 17 relatively swings frontward to touch the brake disc 13 by means of the leverage of the brake actuator so as to apply a brake force in such a manner that the rotor component is braked. Besides, a remarkable fact is that the brake actuator is configured to stay still facing to a wind force when the wind force is weaker than 90 km/hr. In detail, when the wind force is higher than 100 km/hr, the brake actuator is activated because of the wind force such that the whole wind power generating device is self-braking in such a manner that the higher the wind force is, the higher the brake force is. Of course, the present invention is not limited thereto. In other embodiments, the brake actuator can stay still facing to a wind force when the wind force is at other wind speeds, for example weaker than 60, or 70, or 80, or 100, or 110 km/hr. In addition, the lever fulcrum on the lever 14 is biased to the wind collector 16. In more detail, in this embodiment, the wind collector 16 is in flat plate shape. Of course, the present invention is not limited thereto. In another embodiment, as shown in FIG. 3, the wind collector 16a is in spoon shape with its concave side facing towards the front.

Figure 2:
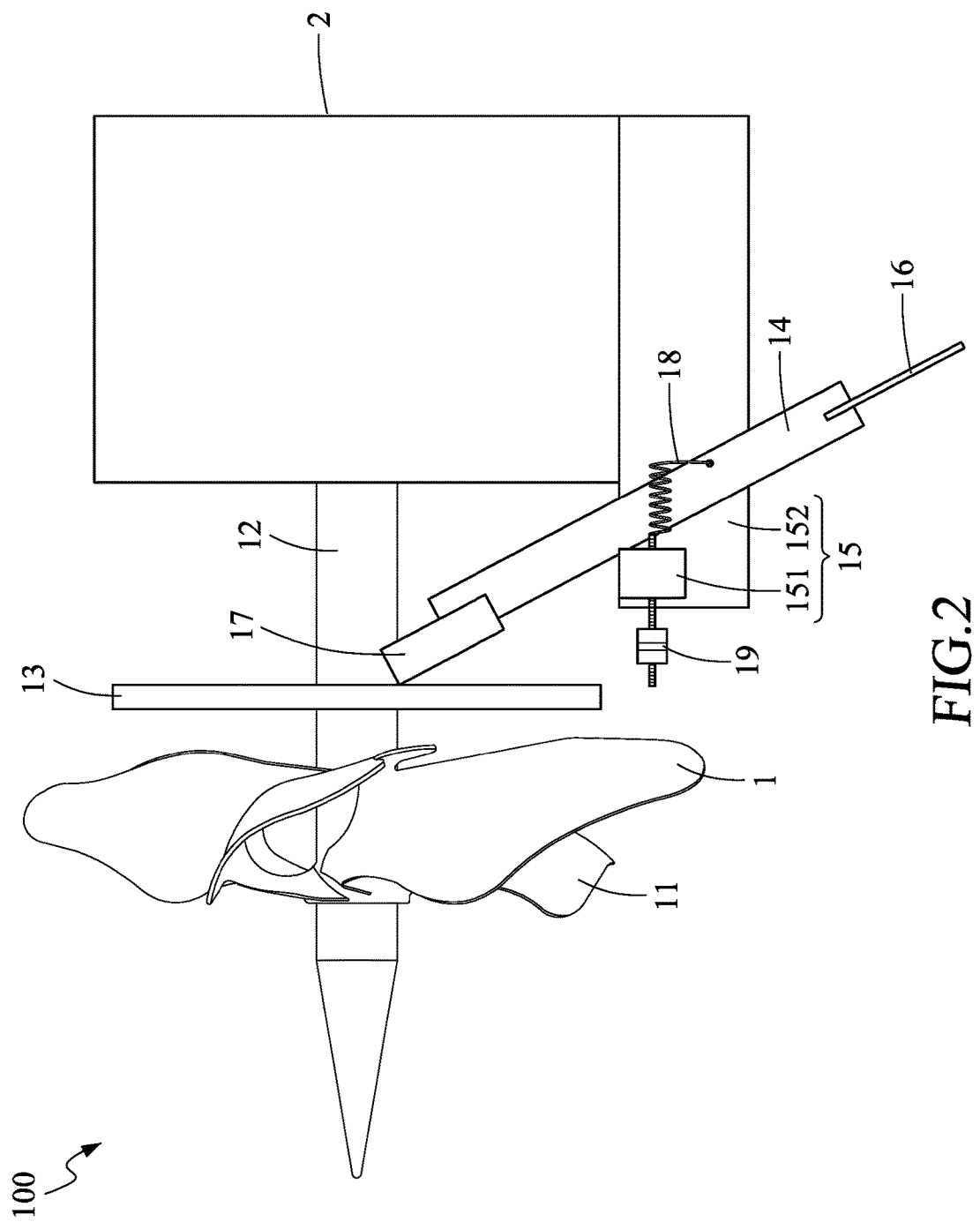
FIG. 2 is a top view illustrating the wind power generating device according to the embodiment of the present invention having the brake pad relatively swung frontward to touch the brake disc.

As shown in FIG. 1 and FIG. 2, in more detail, the brake component further includes an elastic restoration part 18. In this embodiment, the elastic restoration part 18 is a spring. The elastic restoration part is provided with one end connected to the fixed mount 15 and the other end connected to the lever 14 of the brake actuator such that an elastic restoring force applied to the brake actuator makes the wind collector 16 of the brake actuator swing frontward to return to an initial position and make the brake pad 17 of the brake actuator swing backward to release the brake. Preferably, the brake component further includes an adjuster 19 which is connected between the fixed mount 15 and the elastic restoration part 18, the adjuster 19 being configured to change the relative position between the elastic restoration part and the fixed mount so as to adjust the elastic restoring force of the elastic restoration part 18 applied to the brake actuator. In this embodiment, the adjuster 19 is adjustably screwed to the fixed mount 15 to adjust a relative position between the elastic restoration part 18 and the fixed mount 15 by being screwed in so as to tighten the elastic restoration part 18, or screwed out so as to loosen the elastic restoration part 18 with respect to the fixed mount 15 thereby adjusting the elastic restoring force of the elastic restoration part 18 applied to the brake actuator.

Figure 4:
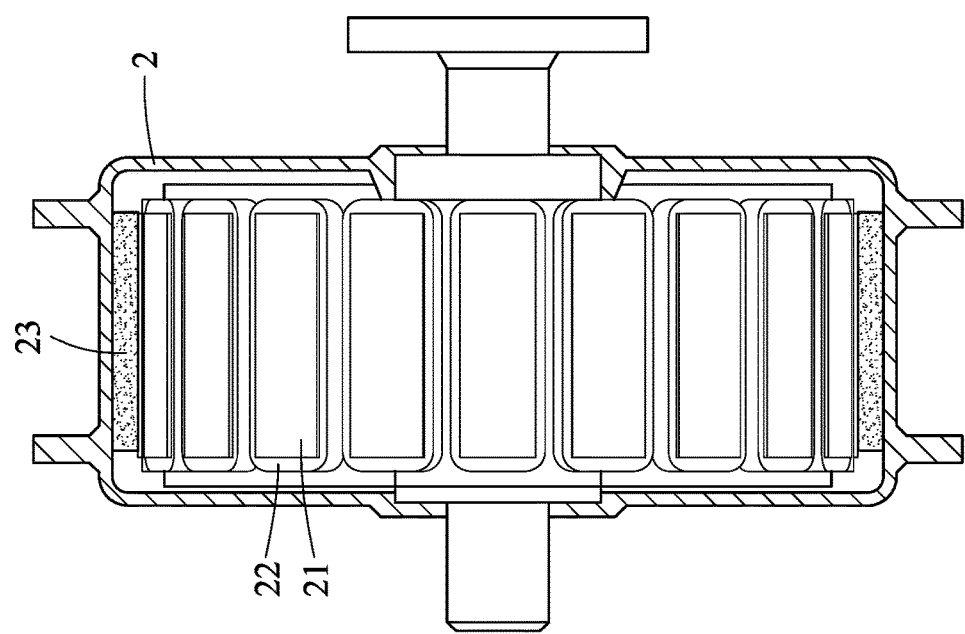
FIG. 4 is a schematic sectional view illustrating a power generating element of the wind power generating device according to the embodiment of the present invention.
Figure 5:
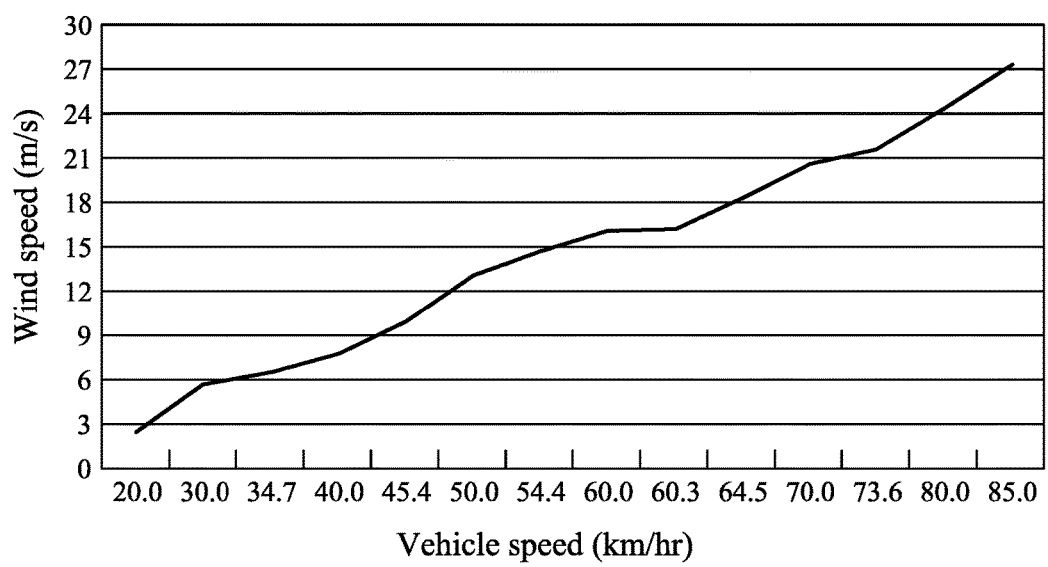
FIG. 5 is a correlation table-chart of the correlation between wind speed and vehicle speed of the wind power generating device according to the embodiment of the present invention.
Figure 6:
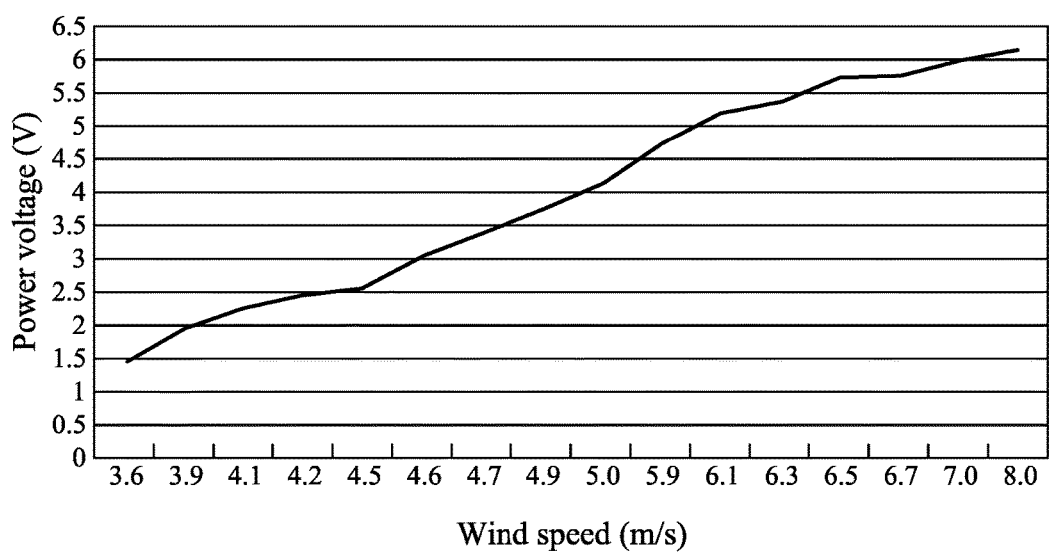
FIG. 6 is a correlation table-chart of the correlation between generated power voltage and wind speed of the wind power generating device according to the embodiment of the present invention.
Figure 7:
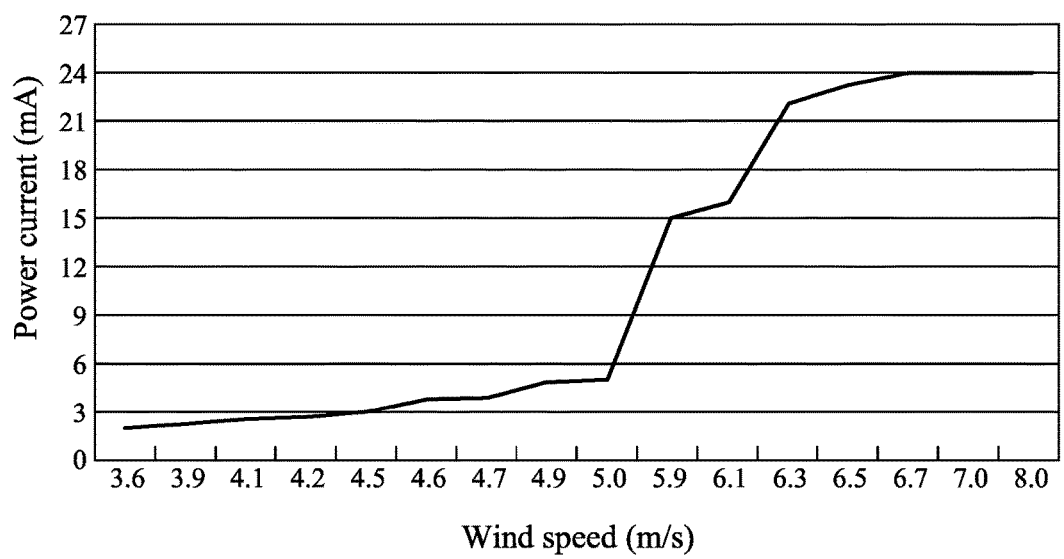
FIG. 7 is a correlation table-chart of the correlation between generated power current and wind speed of the wind power generating device according to the embodiment of the present invention.
Figure 8:
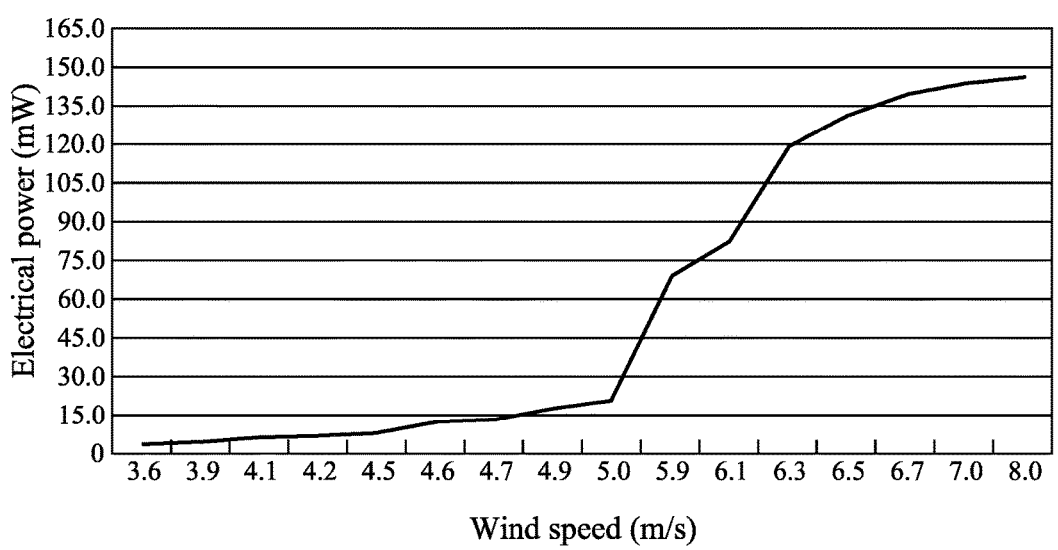
FIG. 8 is a correlation table-chart of the correlation between electrical power and wind speed of the wind power generating device according to the embodiment of the present invention.
Figure 9:
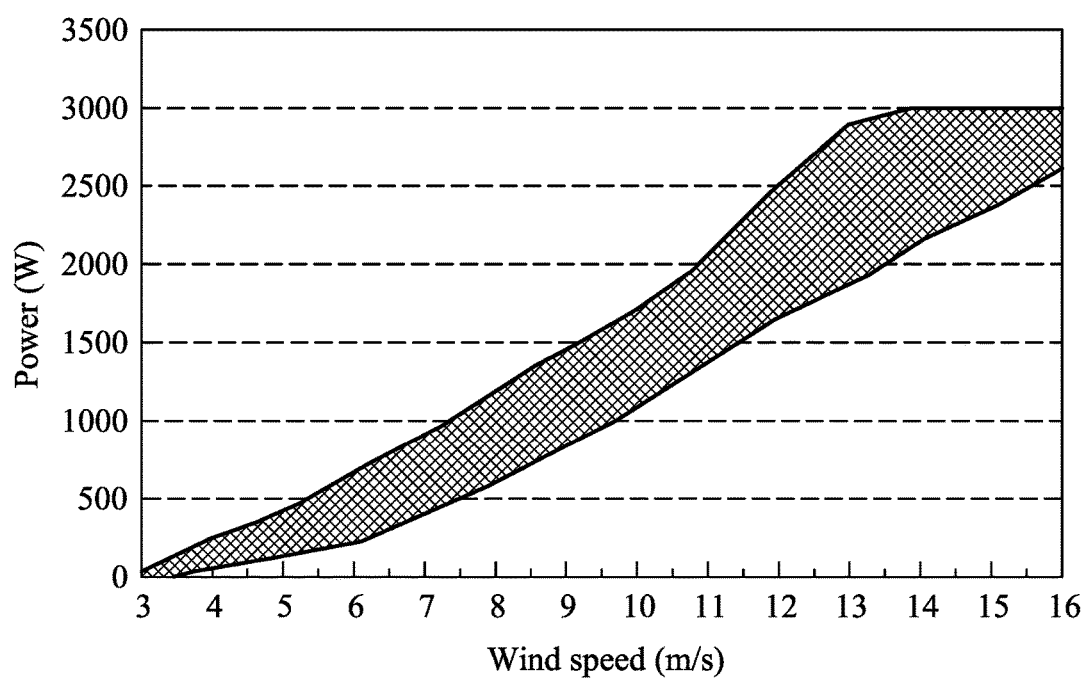
FIG. 9 is a correlation chart of the correlation between power and wind speed of the wind power generating device according to the embodiment of the present invention.

The power generating assembly includes a power generating element 2, a maximum power point tracker (MPPT) 3 and an energy storage element (not shown in the figures) which are electrically connected to each other. In more detail, as shown in FIG. 4, the power generating element 2, which is a power generator, is in drive connection with the drive shaft 12 and includes inner stator poles 21, coils 22 and permanent magnets 23 such that the power generating element 2 is driven by the drive shaft 12 to drive the coils 22 to generate electric energy, and the generated electric energy is stored to the energy storage element under the control of the maximum power point tracker. Thereby, the output voltage of the power generating element 2 can be DC 12V, or 24V, or 36V, or 48V, or 60V, or 72V, or 84V, or 96V.

In more detail, the power generating element 2 is a single device which operates independently. In other embodiments, the power generating element 2 can also be a power generator set with multiple power generators used in parallel such that the power generation can be from 100 W used in parallel to more than 36000 W used in parallel.

As shown in FIG. 5 to FIG. 9, the wind power generating device of the present invention performs a very nice power generating efficiency, when the vehicle speed is at about 20 km/hr inducing a wind speed at more than 5 m/s.

The above description should be considered only as an explanation of the preferred embodiment of the present invention. A person with ordinary skill in the art can make various modifications to the present invention based on the scope of the claims and the above description. However, those modifications shall fall within the scope of the present invention.

What is claimed is:

1. A wind power generating device, comprising:

a power source assembly which includes a rotor component and a brake component, the rotor component including a blade and a drive shaft, the blade being served to receive a wind force from a front side to rotate, the drive shaft being in driven connection with the blade to transfer a rotary motion of the blade, the brake component including a brake disc and a brake actuator, the brake disc being positioned at a back side of the blade and being configured to interlink with the blade so as to rotate together with the blade, the brake actuator being provided with a lever, a wind collector and a brake pad, the lever being provided with a lever fulcrum in such a manner that the wind collector is provided at one end of the lever, the brake pad is provided at the other end of the lever, the lever fulcrum of the lever is located between the wind collector and the brake pad, and a wind force applying on the wind collector swings the lever by taking the lever fulcrum as the fulcrum, wherein a brake surface of the brake pad faces forward a direction where a wind is from so as to touch and brake the brake disc in such a manner that the wind collector and the brake pad move in opposite directions by taking the lever fulcrum as a fulcrum such that when the wind collector swings backward with a pushing of the wind force from the front side, the brake pad relatively swings forward to touch and brake the brake disc by means of the leverage of the brake actuator so as to apply a brake force in such a manner that the rotor component is braked; and a power generating assembly, which includes a power generating element, a maximum power point tracker (MPPT) and an energy storage element which are electrically connected to each other, the power generating element being in drive connection with the drive shaft such that the power generating element is driven by the drive shaft to generate electric energy, and the generated electric energy is stored to the energy storage element under the control of the maximum power point tracker.

2. The wind power generating device of claim 1, wherein the brake component further includes an elastic restoration part, the elastic restoration part being provided with one end connected to a fixed mount and the other end connected to the brake actuator such that an elastic restoring force applied to the brake actuator makes the wind collector of the brake actuator swing forward to return to an initial position and make the brake pad of the brake actuator swing backward to release a brake.

3. The wind power generating device of claim 2, wherein the brake component further includes an adjuster which is connected between a fixed mount and the elastic restoration part, the adjuster being configured to change the relative position between the elastic restoration part and the fixed mount so as to adjust the elastic restoring force of the elastic restoration part applied to the brake actuator.

4. The wind power generating device of claim 3, wherein the adjuster is adjustably screwed to the fixed mount to adjust the elastic restoring force of the elastic restoration part applied to the brake actuator by being screwed in or screwed out with respect to the fixed mount to adjust a relative position between the elastic restoration part and the fixed mount.

5. The wind power generating device of claim 1, wherein the wind collector is in flat plate shape.

6. The wind power generating device of claim 1, wherein the wind collector is in spoon shape.

7. The wind power generating device of claim 1, wherein the blade is a scroll type blade or a screw type blade or a spherical blade or a Venetian blade.

8. The wind power generating device of claim 1, wherein the brake actuator is configured to stay still facing to a wind force when the wind force is weaker than 90 km/hr.

9. A transportation vehicle, comprising the wind power generating device as claimed in any one of the claims 1 to 8.

* * * * *